United States Patent
Seeliger et al.

(10) Patent No.: US 9,447,274 B2
(45) Date of Patent: *Sep. 20, 2016

(54) BIOLOGICALLY-DEGRADABLE POLYESTER MIXTURE

(75) Inventors: Ursula Seeliger, Speyer (DE); Gabriel Skupin, Speyer (DE); Dirk Stärke, Bad Dürkheim (DE)

(73) Assignee: BASF SE (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,030

(22) Filed: Jul. 13, 2011

(65) Prior Publication Data

US 2011/0269873 A1 Nov. 3, 2011

Related U.S. Application Data

(63) Continuation of application No. 11/813,600, filed as application No. PCT/EP2005/014162 on Dec. 31, 2005, now Pat. No. 8,003,731.

(30) Foreign Application Priority Data

Jan. 12, 2005 (DE) .......... 10 2005 001 638
Nov. 4, 2005 (DE) .......... 10 2005 053 069

(51) Int. Cl.
| | |
|---|---|
| C08L 67/02 | (2006.01) |
| C08L 67/04 | (2006.01) |
| C08K 5/101 | (2006.01) |
| C08K 5/20 | (2006.01) |
| C08L 25/14 | (2006.01) |
| C08L 33/06 | (2006.01) |
| C08L 63/00 | (2006.01) |
| C08L 91/00 | (2006.01) |
| C08L 101/06 | (2006.01) |

(52) U.S. Cl.
CPC .......... C08L 67/02 (2013.01); C08L 67/04 (2013.01); C08K 5/101 (2013.01); C08K 5/20 (2013.01); C08L 25/14 (2013.01); C08L 33/068 (2013.01); C08L 63/00 (2013.01); C08L 91/00 (2013.01); C08L 101/06 (2013.01)

(58) Field of Classification Search
CPC ........ C08L 63/00; C08L 67/02; C08L 67/04; C08L 33/068; C08L 25/14; C08L 91/00; C08L 101/06; C08K 5/20; C08K 5/101
USPC ....... 525/166, 174, 176, 190, 404, 410, 411, 525/415, 437, 449, 450
See application file for complete search history.

(56) References Cited

U.S. PATENT DOCUMENTS

| | | | |
|---|---|---|---|
| 5,883,199 A | 3/1999 | McCarthy et al. | |
| 6,018,004 A | 1/2000 | Warzelhan et al. | |
| 6,111,058 A | 8/2000 | Warzelhan et al. | |
| 6,114,042 A | 9/2000 | Warzelhan et al. | |
| 6,120,895 A | 9/2000 | Kowitz et al. | |
| 6,201,034 B1 | 3/2001 | Warzelhan et al. | |
| 6,303,677 B1 | 10/2001 | Warzelhan et al. | |
| 6,353,084 B1 | 3/2002 | Warzelhan et al. | |
| 7,589,156 B2 * | 9/2009 | Kenmoku et al. | 525/411 |
| 7,781,539 B2 * | 8/2010 | Whitehouse | 525/450 |
| 8,003,731 B2 * | 8/2011 | Seeliger et al. | 525/166 |
| 8,163,848 B2 * | 4/2012 | Kobayashi et al. | 525/404 |
| 2004/0024102 A1 | 2/2004 | Hayes et al. | |
| 2004/0068058 A1 | 4/2004 | Bastioli et al. | |
| 2005/0154114 A1 | 7/2005 | Hale | |
| 2007/0123611 A1 * | 5/2007 | Hirose et al. | 524/9 |
| 2007/0213466 A1 * | 9/2007 | Uradnisheck | 525/166 |
| 2008/0161449 A1 | 7/2008 | Yamamoto et al. | |

FOREIGN PATENT DOCUMENTS

| | | |
|---|---|---|
| JP | 07/252411 | 10/1995 |
| JP | 2002/327107 | 11/2002 |
| JP | 2004190026 A | 7/2004 |
| JP | 2004314460 A | 11/2004 |

(Continued)

OTHER PUBLICATIONS

Galloway et al., "Block Copolymer Compatibilization of Coconinuous Polymer Blends", Polymer, vol. 46, pp. 183-191 (2005).

*Primary Examiner* — Robert Jones, Jr.

(74) *Attorney, Agent, or Firm* — Drinker Biddle & Reath LLP

(57) ABSTRACT

The invention relates to biodegradable polyester mixture, comprising i) from 5 to 80% by weight, based on the total weight of components i to ii, of at least one polyester based on aliphatic and aromatic dicarboxylic acids and on aliphatic dihydroxy compounds, and ii) from 20 to 95% by weight, based on the total weight of components i to ii, of at least one biodegradable homo- or copolyester selected from the group consisting of polylactide, polycaprolactone, polyhydroxyalkanoates, and polyesters composed of aliphatic dicarboxylic acids and of aliphatic diols, and iii) from 0.1 to 15% by weight, based on the total weight of components i to ii, a) of a copolymer containing epoxy groups and based on styrene, acrylate, and/or methacrylate, b) of a bisphenol A epoxide, or c) of a fatty acid amide or fatty acid ester or natural oil containing epoxy groups; and iv) from 0 to 15% by weight of additive; and v) from 0 to 50% by weight of inorganic or organic filler, and also to processes for their preparation and a method for their use.

11 Claims, No Drawings

(56) References Cited

FOREIGN PATENT DOCUMENTS

| WO | WO-92/09654 | 6/1992 |
| WO | WO-96/15173 | 5/1996 |
| WO | WO-96/15176 | 5/1996 |
| WO | WO-96/21689 | 7/1996 |
| WO | WO-96/21692 | 7/1996 |
| WO | WO-96/25446 | 8/1996 |
| WO | WO-96/25448 | 8/1996 |
| WO | WO-2005/017034 A1 | 2/2005 |
| WO | WO 2005/054366 * 6/2005 | ............. C08L 67/04 |
| WO | WO-2005/063886 | 7/2005 |

* cited by examiner

BIOLOGICALLY-DEGRADABLE POLYESTER MIXTURE

RELATED APPLICATIONS

This application is a continuation application of U.S. patent application Ser. No. 11/813,600, filed Jul. 10, 2007, which is a national stage application (under 35 U.S.C. §371) of PCT/EP2005/014162 filed Dec. 31, 2005, which claims benefit of German Application No. 10 2005 001 638.3, filed Jan. 12, 2005, and German Application No. 10 2005 053 069.9, filed Nov. 4, 2005.

The present invention relates to biodegradable polyester mixtures, comprising i) from 5 to 90% by weight, based on the total weight of components i to ii, of at least one polyester based on aliphatic and aromatic dicarboxylic acids and on aliphatic dihydroxy compounds;

ii) from 10 to 95% by weight, based on the total weight of components i to ii, of at least one homo- or copolyester selected from the group consisting of polylactide (PLA), polycaprolactone, polyhydroxyalkanoates (e.g. PHB or PHB/V), and polyesters composed of aliphatic dicarboxylic acids and of aliphatic diols;

iii) from 0.1 to 15% by weight, based on the total weight of components i to ii, a) of a copolymer containing epoxy groups and based on styrene, acrylate, and/or methacrylate, b) of a bisphenol A epoxide, or c) of a fatty acid amide or fatty acid ester or natural oil containing epoxy groups; and iv) from 0 to 15% by weight of additives, such as stabilizers, nucleating agents, lubricants and antiblocking agents, waxes, plasticizers, surfactants, antistatic agents, antifogging agents, or dyes;

v) from 0 to 50% by weight of inorganic or organic fillers, such as chalk, talc, silicates, kaolin, mica, wollastonites, montmorillonites, or cellulose-comprising fibers, e.g. cotton, flax, hemp, stinging-nettle fibers, or the like.

The present invention further relates to processes for preparation of biodegradable polyester mixtures, to branching agent masterbatches with whose aid the inventive polyester mixtures can advantageously be prepared, to the use of biodegradable polyester mixtures for production of moldings, of foils, or of fibers, and also to moldings, foils, or fibers comprising biodegradable polyester mixtures.

Biodegradable mixtures composed of i) synthetically prepared polyester materials and ii) homo- or copolyesters— selected from the group consisting of polylactide, polycaprolactone, polyhydroxyalkanoates, and polyesters composed of aliphatic dicarboxylic acids and of aliphatic diols—are known (see EP-B 792 309). Ideally, these mixtures combine the desirable properties of the individual components, for example the generally good processing and mechanical properties of the synthetic polyester with the usually relatively low-cost availability and environmentally non-hazardous preparation and disposal of the polymers ii) listed above, such as polylactide, polycaprolactone, polyhydroxyalkanoates, and polyesters composed of aliphatic dicarboxylic acids and of aliphatic diols.

However, it is often difficult in practice to achieve the desired combination of properties. Polylactide and polyhydroxyalkanoates require complicated predrying in order to prevent degradation of the polymers. The mixtures have inadequate bubble stability in particular for foil applications. This applies particularly to mixtures with more than 20% of polylactide or polyhydroxycarboxylic acids and <80% of aromatic-aliphatic copolyester. Furthermore, thick films in particular manufactured from the mixtures of the prior art have inadequate puncture resistance. This arises especially in the case of thick films which mainly comprise polylactide or polyhydroxycarboxylic acid.

An object underlying the present invention is therefore to provide biodegradable mixtures composed of i) synthetically prepared polyester materials and ii) homo- or copolyesters selected from the group consisting of polylactide, polycaprolactone, polyhydroxyalkanoates, and polyesters composed of aliphatic dicarboxylic acids and of aliphatic diols, these materials not having the abovementioned disadvantages.

This object is achieved by way of the biodegradable polyester mixtures defined at the outset and described in more detail below. The inventive polyester mixtures differ from those of the prior art in particular via the branching agent (component iii).

In principle, any of the polyesters based on aliphatic and aromatic dicarboxylic acids and on aliphatic dihydroxy compounds, known as semiaromatic polyesters, may be used as component i for preparation of the inventive biodegradable polyester mixtures. Mixtures of two or more of these polyesters are of course also suitable as component i.

According to the invention, the term semiaromatic polyesters is also intended to include polyester derivatives, such as polyetheresters, polyesteramides, or polyetheresteramides. Among the suitable semiaromatic polyesters are linear non-chain-extended polyesters (WO 92/09654). Preference is given to chain-extended and/or branched semiaromatic polyesters. The latter are disclosed in the specifications mentioned at the outset, WO 96/15173-15176, 21689-21692, 25446, 25448, WO 98/12242, expressly incorporated herein by way of reference. Mixtures of different semiaromatic polyesters may also be used. In particular, the term semiaromatic polyesters is intended to mean products such as Ecoflex® (BASF Aktiengesellschaft) and Easter® Bio (Novamont).

Among the particularly preferred semiaromatic polyesters are polyesters which comprise the following significant components A) an acid component composed of a1) from 30 to 99 mol % of at least one aliphatic, or at least one cycloaliphatic, dicarboxylic acid, or its ester-forming derivatives, or a mixture of these a2) from 1 to 70 mol % of at least one aromatic dicarboxylic acid, or its ester-forming derivative, or a mixture of these, and a3) from 0 to 5 mol % of a compound comprising sulfonate groups, B) a diol component selected from at least one $C_2$-$C_{12}$ alkanediol and at least one $C_5$-$C_{10}$ cycloalkanediol, or a mixture of these, and, if desired, also one or more components selected from C) a component selected from the group consisting of c1) at least one dihydroxy compound comprising ether functions and having the formula I $$HO-[(CH_2)_n-O]_m-H \qquad (I)$$

where n is 2, 3 or 4 and m is a whole number from 2 to 250, c2) at least one hydroxycarboxylic acid of the formula IIa or IIb

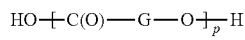
(IIa)

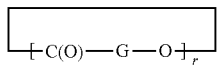
(IIb)

where p is a whole number from 1 to 1500 and r is a whole number from 1 to 4, and G is a radical selected from the group consisting of phenylene, —$(CH_2)_q$—, where q is a whole number from 1 to 5, —C(R)H— and —C(R)HCH$_2$—, where R is methyl or ethyl, c3) at least one amino-$C_2$-$C_{12}$ alkanol, or at least one amino-$C_5$-$C_{10}$ cycloalkanol, or a mixture of these, c4) at least one diamino-$C_1$-$C_8$ alkane, c5) at least one 2,2'-bisoxazoline of the formula III

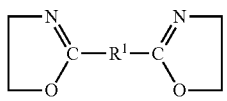
(III)

where $R^1$ is a single bond, a $(CH_2)_z$-alkylene group, where z=2, 3 or 4, or a phenylene group c6) at least one aminocarboxylic acid selected from the group consisting of the naturally occurring amino acids, polyamides obtainable by polycondensing a dicarboxylic acid having from 4 to 6 carbon atoms with a diamine having from 4 to 10 carbon atoms, compounds of the formulae IVa and IVb

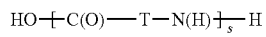
(IVa)

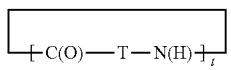
(IVb)

where s is an integer from 1 to 1500 and t is a whole number from 1 to 4, and T is a radical selected from the group consisting of phenylene, —$(CH_2)_u$—, where u is a whole number from 1 to 12, —$C(R^2)H$— and —$C(R^2)HCH_2$—, where $R^2$ is methyl or ethyl, and polyoxazolines having the repeat unit V

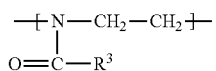
(V)

where $R^3$ is hydrogen, $C_1$-$C_6$-alkyl, $C_5$-$C_8$-cycloalkyl, phenyl, either unsubstituted or with up to three $C_1$-$C_4$-alkyl substituents, or tetrahydrofuryl, or a mixture composed of c1 to c6,
and of D) a component selected from d1) at least one compound having at least three groups capable of ester formation, d2) at least one isocyanate d3) at least one divinyl ether, or a mixture composed of d1) to d3).

In one preferred embodiment, the acid component A of the semiaromatic polyesters comprises from 30 to 70 mol %, in particular from 40 to 60 mol %, of a1, and from 30 to 70 mol %, in particular from 40 to 60 mol %, of a2.

Aliphatic acids and the corresponding derivatives a1 which may be used are generally those having from 2 to 10 carbon atoms, preferably from 4 to 6 carbon atoms. They may be either linear or branched. The cycloaliphatic dicarboxylic acids which may be used for the purposes of the present invention are generally those having from 7 to 10 carbon atoms and in particular those having 8 carbon atoms. In principle, however, it is also possible to use dicarboxylic acids having a larger number of carbon atoms, for example having up to 30 carbon atoms.

Examples which may be mentioned are: malonic acid, succinic acid, glutaric acid, 2-methylglutaric acid, 3-methylglutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, and 2,5-norbornanedicarboxylic acid.

Ester-forming derivatives of the abovementioned aliphatic or cycloaliphatic dicarboxylic acids which may also be used and which may be mentioned are in particular the di-$C_1$-$C_6$-alkylesters, such as dimethyl, diethyl, di-n-propyl, diisopropyl, di-n-butyl, diisobutyl, di-tert-butyl, di-n-pentyl, diisopentyl or di-n-hexylesters. It is also possible to use anhydrides of the dicarboxylic acids.

The dicarboxylic acids or their ester-forming derivatives may be used here individually or in the form of a mixture composed of two or more of these.

It is preferable to use succinic acid, adipic acid, azelaic acid, sebacic acid, brassylic acid, or their respective ester-forming derivatives, or a mixture thereof. It is particularly preferable to use succinic acid, adipic acid, or sebacic acid, or their respective ester-forming derivatives, or a mixture thereof. It is particularly preferable to use adipic acid or its ester-forming derivatives, for example its alkyl esters or a mixture of these. Sebacic acid or a mixture of sebacic acid with adipic acid is preferably used as aliphatic dicarboxylic acid when polymer mixtures having "hard" or "brittle" components ii), such as polyhydroxybutyrate or in particular polylactide, are prepared. Succinic acid or a mixture of succinic acid with adipic acid is preferably used as aliphatic dicarboxylic acid when polymer mixtures with "soft" or "tough" components ii), such as polyhydroxybutyrate-co-valerate, are prepared.

Succinic acid, azelaic acid, sebacic acid, and brassylic acid have the additional advantage of being available in the form of renewable raw materials.

Aromatic dicarboxylic acids a2 which may be mentioned are generally those having from 8 to 12 carbon atoms and preferably those having 8 carbon atoms. By way of example, mention may be made of terephthalic acid, isophthalic acid, 2,6-naphthoic acid and 1,5-naphthoic acid, and also ester-forming derivatives of these. Particular mention may be made here of the di-$C_1$-$C_6$-alkylesters, e.g. dimethyl, diethyl, di-n-propyl, diisopropyl, di-n-butyl, diisobutyl, di-tert-butyl, di-n-pentyl-, diisopentyl, or di-n-hexylesters. The anhydrides of the dicarboxylic acids a2 are also suitable ester-forming derivatives.

However, in principle it is also possible to use aromatic dicarboxylic acids a2 having a greater number of carbon atoms, for example up to 20 carbon atoms.

The aromatic dicarboxylic acids or ester-forming derivatives of these a2 may be used individually or as a mixture of two or more of these. It is particularly preferable to use terephthalic acid or its ester-forming derivatives, such as dimethyl terephthalate.

The compound used comprising sulfonate groups is usually one of the alkali metal or alkaline earth metal salts of a sulfonate-containing dicarboxylic acid or ester-forming derivatives thereof, preferably alkali metal salts of 5-sulfoisophthalic acid or mixtures of these, particularly preferably the sodium salt.

In one of the preferred embodiments, the acid component A comprises from 40 to 60 mol % of a1, from 40 to 60 mol % of a2 and from 0 to 2 mol % of a3. In another preferred embodiment, the acid component A comprises from 40 to 59.9 mol % of a1, from 40 to 59.9 mol % of a2 and from 0.1 to 1 mol % of a3, in particular from 40 to 59.8 mol % of a1, from 40 to 59.8 mol % of a2 and from 0.2 to 0.5 mol % of a3.

The diols B are generally selected from the group consisting of branched or linear alkanediols having from 2 to 12 carbon atoms, preferably from 4 to 6 carbon atoms, or from the group consisting of cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, in particular ethylene glycol, 1,3-propanediol, 1,4-butanediol or 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. Particular preference is given to 1,4-butanediol, in particular in combination with adipic acid as component a1) and 1,3-propanediol, in particular in combination with sebacic acid as component a1). 1,3-propanediol and 1,4-butanediol have the additional advantage of being obtainable in the form of renewable raw materials. It is also possible to use mixtures of different alkanediols.

Depending on whether an excess of acid groups or of OH end groups is desired, either component A or component B may be used in excess. In one preferred embodiment, the molar ratio of the components A and B used may be from 0.4:1 to 1.5:1, preferably from 0.6:1 to 1.1:1.

Besides components A and B, the polyesters on which the polyester mixtures of the invention are based may comprise other components.

Dihydroxy compounds c1 which are preferably used are diethylene glycol, triethylene glycol, polyethylene glycol, polypropylene glycol and polytetrahydrofuran (polyTHF), particularly preferably diethylene glycol, triethylene glycol and polyethylene glycol, and mixtures of these may also be used, as may compounds which have different variables n (see formula I), for example polyethylene glycol which comprises propylene units (n=3), obtainable, for example, by using methods of polymerization known per se and polymerizing first with ethylene oxide and then with propylene oxide, and particularly preferably a polymer based on polyethylene glycol with different variables n, where units formed from ethylene oxide predominate. The molar mass ($M_n$) of the polyethylene glycol is generally selected within the range from 250 to 8000 g/mol, preferably from 600 to 3000 g/mol.

In one of the preferred embodiments for preparing the semiaromatic polyesters use may be made, for example, of from 15 to 98 mol %, preferably from 60 to 99.5 mol %, of the diols B and from 0.2 to 85 mol %, preferably from 0.5 to 30 mol %, of the dihydroxy compounds c1, based on the molar amount of B and c1.

In one preferred embodiment, the hydroxycarboxylic acid c2) used is: glycolic acid, D-, L- or D,L-lactic acid, 6-hydroxyhexanoic acid, cyclic derivatives of these, such as glycolide (1,4-dioxane-2,5-dione), D- or L-dilactide (3,6-dimethyl-1,4-dioxane-2,5-dione), p-hydroxybenzoic acid, or else their oligomers and polymers, such as 3-polyhydroxybutyric acid, polyhydroxyvaleric acid, polylactide (for example that obtainable in the form of NatureWorks® (Cargill)), or else a mixture of 3-polyhydroxybutyric acid and polyhydroxyvaleric acid (the latter being obtainable as Biopol® from Zeneca) and, for preparing semiaromatic polyesters, particularly preferably the low-molecular-weight and cyclic derivatives thereof.

Examples of amounts which may be used of the hydroxycarboxylic acids are from 0.01 to 50% by weight, preferably from 0.1 to 40% by weight, based on the amount of A and B.

The amino-$C_2$-$C_{12}$ alkanol or amino-$C_5$-$C_{10}$ cycloalkanol used (component c3) which for the purposes of the present invention also include 4-aminomethylcyclohexanemethanol, are preferably amino-$C_2$-$C_6$ alkanols, such as 2-aminoethanol, 3-aminopropanol, 4-aminobutanol, 5-aminopentanol or 6-aminohexanol, or else amino-$C_5$-$C_6$ cycloalkanols, such as aminocyclopentanol and aminocyclohexanol, or mixtures of these.

The diamino-$C_1$-$C_8$ alkanes (component c4) used are preferably diamino-$C_4$-$C_6$ alkanes, such as 1,4-diaminobutane, 1,5-diaminopentane or 1,6-diaminohexane (hexamethylenediamine, "HMD").

In one preferred embodiment for preparing the semiaromatic polyesters, use may be made of from 0.5 to 99.5 mol %, preferably from 0.5 to 50 mol %, of c3, based on the molar amount of B, and of from 0 to 50 mol %, preferably from 0 to 35 mol %, of c4, based on the molar amount of B.

The 2,2'-bisoxazolines c5 of the formula III are generally obtainable via the process of Angew. Chem. Int. Edit., Vol. 11 (1972), pp. 287-288. Particularly preferred bisoxazolines are those where $R^1$ is a single bond, $(CH_2)_z$-alkylene, where z=2, 3 or 4, for example methylene, ethane-1,2-diyl, propane-1,3-diyl or propane-1,2-diyl, or a phenylene group. Particularly preferred bisoxazolines which may be mentioned are 2,2'-bis(2-oxazoline), bis(2-oxazolinyl)methane, 1,2-bis(2-oxazolinyl)ethane, 1,3-bis(2-oxazolinyl)propane and 1,4-bis(2-oxazolinyl)butane, in particular 1,4-bis(2-oxazolinyl)benzene, 1,2-bis(2-oxazolinyl)benzene or 1,3-bis(2-oxazolinyl)benzene.

In preparing the semiaromatic polyesters use may, for example, be made of from 70 to 98 mol % of B, up to 30 mol % of c3 and from 0.5 to 30 mol % of c4 and from 0.5 to 30 mol % of c5, based in each case on the total of the molar amounts of components B, c3, c4 and c5. In another preferred embodiment, use may be made of from 0.1 to 5% by weight, preferably from 0.2 to 4% by weight, of c5, based on the total weight of A and B.

The component c6 used may be naturally occurring aminocarboxylic acids. These include valine, leucine, isoleucine, threonine, methionine, phenylalanine, tryptophan, lysine, alanine, arginine, aspartamic acid, cysteine, glutamic acid, glycine, histidine, proline, serine, tyrosine, asparagine and glutamine.

Preferred aminocarboxylic acids of the formulae IVa and IVb are those where s is an integer from 1 to 1000 and t is an integer from 1 to 4, preferably 1 or 2, and t has been selected from the group consisting of phenylene and —(CH$_2$)$_u$—, where u is 1, 5, or 12.

c6 may also be a polyoxazoline of the formula V. However, c6 may also be a mixture of different aminocarboxylic acids and/or polyoxazolines.

In one preferred embodiment, the amount of c6 used is from 0.01 to 50% by weight, preferably from 0.1 to 40% by weight, based on the total amount of components A and B.

Among other components which may be used, if desired, for preparing the semiaromatic polyesters are compounds d1 which comprise at least three groups capable of ester formation.

The compounds d1 preferably comprise from three to ten functional groups which are capable of developing ester bonds. Particularly preferred compounds d1 have from three to six functional groups of this type in the molecule, in particular from three to six hydroxy groups and/or carboxy groups. Examples which should be mentioned are:

tartaric acid, citric acid, maleic acid;
trimethylolpropane, trimethylolethane;
pentaerythritol;
polyethertriols;
glycerol;
trimesic acid;
trimellitic acid, trimellitic anhydride;
pyromellitic acid, pyromellitic dianhydride, and
hydroxyisophthalic acid.

The amounts generally used of the compounds d1 are from 0.01 to 15 mol %, preferably from 0.05 to 10 mol %, particularly preferably from 0.1 to 4 mol %, based on component A.

Components d2 used are an isocyanate or a mixture of different isocyanates. For example, aromatic or aliphatic diisocyanates may be used. However, higher-functionality isocyanates may also be used.

For the purposes of the present invention, aromatic diisocyanate d2 is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate or xylylene diisocyanate.

Among these, particular preference is given to diphenylmethane 2,2'-, 2,4'- and 4,4'-diisocyanate as component d2. The latter diisocyanates are generally used as a mixture.

A three-ring isocyanate d2 which may also be used is tri(4-isocyanophenyl)methane. Multi-ringed aromatic diisocyanates arise during the preparation of single- or two-ring diisocyanates, for example.

Component d2 may also comprise subordinate amounts, e.g. up to 5% by weight, based on the total weight of component d2, of uretdione groups, for example for capping the isocyanate groups.

For the purposes of the present invention, an aliphatic diisocyanate d2 is primarily a linear or branched alkylene diisocyanate or cycloalkylene diisocyanate having from 2 to 20 carbon atoms, preferably from 3 to 12 carbon atoms, e.g. hexamethylene 1,6-diisocyanate, isophorone diisocyanate, or methylenebis(4-isocyanatocyclohexane). Hexamethylene 1,6-diisocyanate and isophorone diisocyanate are particularly preferred aliphatic diisocyanates d2.

Among the preferred isocyanurates are the aliphatic isocyanurates which derive from $C_2$-$C_{20}$, preferably $C_3$-$C_{12}$, cycloalkylene diisocyanates or alkylene diisocyanates, e.g. isophorone diisocyanate or methylenebis(4-isocyanatocyclohexane). The alkylene diisocyanates here may be either linear or branched. Particular preference is given to isocyanurates based on n-hexamethylene diisocyanate, for example cyclic trimers, pentamers, or higher oligomers of n-hexamethylene diisocyanate.

The amounts generally used of component d2 are from 0.01 to 5 mol %, preferably from 0.05 to 4 mol %, particularly preferably from 0.1 to 4 mol %, based on the total of the molar amounts of A and B.

Divinyl ethers d3 which may be used are generally any of the customary and commercially available divinyl ethers. Preference is given to the use of 1,4-butanediol divinyl ethers, 1,6-hexanediol divinyl ethers or 1,4-cyclohexanedimethanol divinyl ethers or a mixture of these.

The amounts of the divinyl ethers preferably used are from 0.01 to 5% by weight, especially from 0.2 to 4% by weight, based on the total weight of A and B.

Examples of preferred semiaromatic polyesters are based on the following components A, B, d1
A, B, d2
A, B, d1, d2
A, B, d3
A, B, c1
A, B, c1, d3
A, B, c3, c4
A, B, c3, c4, c5
A, B, d1, c3, c5
A, B, c3, d3
A, B, c3, d1
A, B, c1, c3, d3
A, B, c2

Among these, particular preference is given to semiaromatic polyesters based on A, B and d1, or A, B and d2, or A, B, d1 and d2. In another preferred embodiment, the semiaromatic polyesters are based on A, B, c3, c4 and c5 or A, B, d1, c3 and c5.

The semiaromatic polyesters mentioned and the inventive polyester mixtures are generally biodegradable.

For the purposes of the present invention, a substance or a mixture of substances complies with the feature termed "biodegradable" if this substance or the mixture of substances has a percentage degree of biodegradation of at least 60% in at least one of the three processes defined in DIN V 54900-2 (preliminary standard, as at September 1998).

The result of the biodegradability is generally that the polyesters or polyester mixtures break down within an appropriate and demonstrable period. The degradation may be brought about enzymatically, hydrolytically, oxidatively, and/or via exposure to electromagnetic radiation, such as UV radiation, and is mostly predominantly caused by exposure to microorganisms, such as bacteria, yeasts, fungi, and algae. An example of a method of quantifying the biodegradability mixes polyester with compost and stores it for a particular time. By way of example, according to DIN EN 13432 or DIN V 54900-2, Method 3, $CO_2$-free air is passed through ripened compost during the composting process and the compost is subjected to a defined temperature profile. Biodegradability is determined here by way of the ratio of the net amount of $CO_2$ liberated from the specimen (after deducting the amount of $CO_2$ liberated by the compost without the specimen) to the maximum possible amount of $CO_2$ liberated by the specimen (calculated from the carbon content of the specimen), this ratio being defined as the percentage biodegradability. Even after a few days of composting, biodegradable polyesters or biodegradable polyester mixtures generally show marked signs of degradation, for example fungal growth, tracking, and perforation.

Other methods of determining biodegradability are described by way of example in ASTM D5338 and ASTM D6400.

The preparation of the semiaromatic polyesters is known per se or can take place by methods known per se.

The preferred semiaromatic polyesters are characterized by a molar mass ($M_n$) in the range from 1000 to 100 000 g/mol, in particular in the range from 9000 to 75 000 g/mol, preferably in the range from 10 000 to 50 000 g/mol, and by a melting point in the range from 60 to 170° C., preferably in the range from 80 to 150° C.

The semiaromatic polyesters mentioned may have hydroxy and/or carboxy end groups in any desired ratio. The semiaromatic polyesters mentioned may also have been end-group-modified. By way of example, OH end groups may have been acid-modified via reaction with phthalic acid, phthalic anhydride, trimellitic acid, trimellitic anhydride, pyromellitic acid, or pyromellitic anhydride.

In principle, suitable components ii of the biodegradable polyester mixtures are homo- or copolyesters selected from the group consisting of polylactide, polycaprolactone, polyhydroxyalkanoates, and polyesters composed of aliphatic dicarboxylic acids and of aliphatic diols. Preferred components ii are polylactide (PLA) and polyhydroxyalkanoates, and in particular here polyhydroxybutyrate (PHB) and polyhydroxybutyrate-co-valerate (PHBV). Among the materials are in particular products such as NatureWorks® (Polylactide from Cargill Dow), Biocycle® (polyhydroxybutyrate from PHB Ind.); Enmat® (polyhydroxybutyrate-co-valerate from Tianan).

The inventive component iii comprises a) of a copolymer containing epoxy groups and based on styrene, acrylate, and/or methacrylate, b) of a bisphenol A epoxide, or c) of a fatty acid amide or fatty acid ester or natural oil containing epoxy groups. It is preferable to use a copolymer containing epoxy groups and based on styrene, acrylate, and/or methacrylate. The compounds generally have two or more epoxy groups in the molecule. Oligomeric or polymeric epoxidized compounds are particularly suitable, examples being di- or polyglycidic esters of di- or polycarboxylic acids, or di- or polyglycidic esters of di- or polyols, or copolymers composed of styrene and of glycidyl (meth)acrylates, for example as marketed by Johnson Polymer with the trade mark Joncryl® ADR 4368. Other preferred components iii are compounds whose molecule comprises at least one carbon-carbon double or triple bond and comprises at least one epoxy group. Glycidyl acrylate and glycidyl methacrylate are particularly suitable.

Further preference is given to c) fatty acid esters or naturally occurring oils containing epoxy groups (epoxidized) as component iii). Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g. Merginat® ESBO from Hobum, Hamburg, or Edenol® B 316 from Cognis, Düsseldorf). It is particularly preferable that the structural types a) and c) are combined as component iii). As explained in more detail in the examples, particular preference is given to the combination of Joncryl® ADR 4368 (structural type a)) and Merginat® ESBO (structural type c)).

The amount of component iii) used is from 0.1 to 15% by weight, preferably from 0.1 to 10% by weight, and particularly preferably from 0.5 to 2% by weight, based on the total weight of components i) to ii).

The inventive biodegradable polyester mixtures usually comprise from 5 to 90% by weight, preferably from 10 to 85% by weight, particularly preferably from 15 to 80% by weight, in particular from 40 to 60% by weight, of component i and from 10 to 95% by weight, preferably from 20 to 80% by weight, particularly preferably from 40 to 80% by weight, very particularly preferably from 40 to 60% by weight, of component ii, where the percentages by weight are always based on the total weight of components i to ii and give a total of 100% by weight.

For production of extruded thermoplastics, for example foils, bubble stability is of great importance. It has now been found that mixtures in which component i forms a preferably continuous phase, or at least a cocontinuous phase, and component ii has been embedded in separate regions into this phase have good bubble stability. In order that component i forms a continuous phase, the mixtures generally have more than 40% by weight, preferably more than 50% by weight of component i, based in each case on the total weight of components i and ii.

For production of moldings, for example for injection molding, polyester mixtures with high polyhydroxybutyrate (PHB) content or in particular high polylactide (PLA) content (component ii) can be used. It is usually possible here to realize mixtures of from 60 to 95% by weight of component. An improved process for preparation of impact-resistant molding compositions is described in the preparation processes.

If polyesters comprising sebacic acid (component a1)) or comprising a mixture of sebacic acid with adipic acid are used as component i), the content of the polyester in the mixtures with component ii) can indeed even be lowered below the 10% by weight limit.

The inventive biodegradable polyester mixtures moreover usually comprise from 0.1 to 15% by weight, preferably from 0.1 to 10% by weight, particularly preferably from 0.5 to 5% by weight, of component iii, where the percentages by weight are in each case based on the total weight of components i to ii.

The inventive biodegradable polyester mixtures may comprise other additives known to the person skilled in the art. Particular additives are stabilizers, nucleating agents, lubricants and antiblocking agents, such as stearates (in particular calcium stearate), waxes, such as beeswax or beeswax ester; plasticizers, such as citric ester (in particular tributyl acetylcitrate), glycerol esters, such as triacetylglycerol, or ethylene glycol derivatives; surfactants, such as polysorbates, palmitates, laureates; antistatic agents, antifogging agents, or dyes. The concentrations used of the additives are from 0 to 15% by weight, in particular from 1 to 10% by weight, based on the inventive polyester mixtures.

Fillers that can be used are the inorganic or organic fillers mentioned at the outset. The concentrations used of the fillers are from 0 to 50% by weight, in particular from 1 to 10% by weight, based on the inventive polyester mixtures.

The inventive biodegradable polyester mixtures can be prepared from the individual components by known processes (EP 792 309 and U.S. Pat. No. 5,883,199).

By way of example, all of the components i, ii, and iii can be mixed and reacted in the mixing apparatus known to the person skilled in the art, such as kneaders or extruders, at elevated temperatures, e.g. from 120° C. to 250° C., in one processing step. The reaction is preferably carried out in the presence of a free-radical initiator.

An improved process for preparation of the inventive biodegradable polyester mixtures has moreover been found.

For this, in a first step, from 1 to 50% by weight, preferably from 5 to 35% by weight, of component iii is mixed with from 50 to 99% by weight, and preferably from 65 to 95% by weight, of component i at temperatures of from 110 to 145° C., preferably from 120 to 140° C., to give a branching agent masterbatch. At these temperatures, a homogeneous blend is obtained, without significant molecular weight increase. The resultant branching agent masterbatch can be stored at room temperature without difficulty. In a second step, the desired constitution can be established via addition of the branching agent masterbatch to component ii and, if appropriate, to further component i. This compounding step is carried out at from 150 to 250° C., preferably from 160 to 190° C.

The temperatures in the compounding step can generally be lowered, thus avoiding decomposition of delicate biopolymers, such as polyhydroxybutyrates, by using an activator selected from the group consisting of: zinc, tin, titanium compound, and $C_1$-$C_{12}$-alkyltriphenylphosphonium halide.

Typical branching agent masterbatches comprise from 5 to 35% by weight, preferably from 10 to 20% by weight, of component iii) and from 65 to 95% by weight, preferably from 80 to 90% by weight, of component i. Surprisingly, these branching agent masterbatches have proven to be advantageous when compared with corresponding branching agent masterbatches composed of components ii) and iii). The branching agent masterbatches are provided by the present invention. From examples 4 to 6 listed at a later stage below it is clear that the inventive branching agent masterbatches composed of components i) and iii) have advantages in relation to the flow rate of the polyester mixtures formed, when compared with the branching agent masterbatches currently available for purchase (e.g. polylactide and glycidyl methacrylate). The inventive branching agent masterbatches also feature excellent storage stability.

Examples of inventive branching agent masterbatches are:

component i), polyester prepared via condensation of:
adipic acid/terephthalic acid and 1,4-butanediol (e.g. Ecoflex® FBX 7011);
adipic acid/terephthalic acid and 1,3-propanediol;
succinic acid/terephthalic acid and 1,4-butanediol;
succinic acid/terephthalic acid and 1,3-propanediol;
sebacic acid/terephthalic acid and 1,4-butanediol;
sebacic acid/terephthalic acid and 1,3-propanediol;
azelaic acid/terephthalic acid and 1,4-butanediol;
brassylic acid/terephthalic acid and 1,4-butanediol; and
component iii): glycidyl-styrene (meth)acrylate copolymer (e.g. Joncryl® ADR 4368 from Johnson Polymer).

To prepare polyester mixtures with high content of "hard" or "brittle" component ii), for example >50% by weight of polyhydroxybutyrate or in particular polylactide, the following procedure has proven to be particularly advantageous. An intermediate compounded material is prepared as described above either via mixing of components i), ii), and iii), or in two steps via mixing of one of the abovementioned branching agent masterbatches with component ii) and, if appropriate, another component i), and preferably comprises from 48 to 60% by weight of component i), from 40 to 50% by weight of component ii), and from 0.5 to 2% by weight of component iii). In an additional step, this intermediate compounded material is now treated with further component ii) until the desired content of component ii) has been established in the polyester mixture. The polyester mixture prepared by this three-stage process has excellent suitability for preparation of biodegradable, impact-resistant polyester mixtures.

When polymer mixtures with high content of "hard" or "brittle" components ii), such as polyhydroxybutyrate or in particular polylactide, are prepared, sebacic acid or a mixture of sebacic acid with adipic acid is preferably used as aliphatic dicarboxylic acid.

On the basis of experience with other compounded materials (e.g. development of compounded Ecoflex/starch materials), a variation was made in the approach—use of a compatibilizer—to achievement of the object. Instead of incorporating the compatibilizer into the entire matrix, at high cost, only a portion of the Ecoflex/PLA formulation was modified with a compatibilizer concentrate. Examples of what is known as a compatibilizer masterbatch are the intermediate compounded materials and branching agent masterbatches mentioned above. This saves compounding costs:

from 9.5 to 89.5% by weight of Ecoflex, from 89.5 to 9.5% by weight of PLA, from 0.5 to 20% by weight of branching agent masterbatch, from 0 to 15% by weight of additives (e.g. palmitate, laurate, stearate, PEG, citrate, and/or glycerol derivatives) and from 0 to 50% by weight of fillers (chalk, talc, kaolin, silica, etc.)

from 29.5 to 59.5% by weight of Ecoflex, from 59.5 to 29.5% by weight of PLA, from 0.5 to 20% by weight of branching agent masterbatch, from 0 to 15% by weight of additives (e.g. palmitate, laurate, stearate, PEG, citrate, and/or glycerol derivatives) and from 0 to 50% by weight of fillers (chalk, talc, kaolin, silica)

The inventive biodegradable polyester mixtures are particularly suitable for production of moldings, foils, or fibers. The preparation process may use methods known to the person skilled in the art.

One particular application sector for the biodegradable polyester mixtures with improved degradation rates concerns use for production of foils, in particular mulch foils for agriculture. These mulch foils are laid to provide protection and to accelerate growth, mostly of young seedlings in fields. After harvest, these mulch foils are left on the field or—in the case of biodegradable mulch foils—are plowed to the soil. Substantial biodegradation of these mulch foils has to occur by the start of sowing in the following year.

Biodegradable polymer mixtures obtained with the aid of the inventive biodegradable polyester mixtures can be processed without difficulty (with bubble stability) to give puncture-resistant foils.

EXAMPLES

Application-Related Tests

The molecular weight $M_n$ of the semiaromatic polyesters was determined as follows:

15 mg of the semiaromatic polyesters were dissolved in 10 ml of hexafluoroisopropanol (HFIP). In each case, 125 µl of this solution were analyzed by gel permeation chromatography (GPC). The measurements were made at room temperature. For elution, use was made of HFIP+0.05% by weight of potassium trifluoroacetate. The elution rate was 0.5 ml/min. The following combination of columns was used here (all of the columns being produced by the company Showa Denko Ltd., Japan): Shodex® HFIP-800P (diameter 8 mm, length 5 cm), Shodex® HFIP-803 (diameter 8 mm, length 30 cm), Shodex® HFIP-803 (diameter 8 mm, length 30 cm). The semiaromatic polyesters were detected by an RI detector (differential refractometry). Narrowly distributed polymethyl methacrylate standards with molecular weights of from $M_n$=505 to $M_n$=2 740 000 were used for calibration. Elution ranges outside this interval were determined by extrapolation.

The melting points of the semiaromatic polyesters were determined by DSC measurements, using Exstar DSC 6200R equipment from the company Seiko:

from 10 to 15 mg of the respective specimens were heated under nitrogen at a heating rate of 20° C./min from −70° C. to 200° C. The melting points given for the specimens were the peak temperatures of the melting peak observed during this test. In each case, an empty specimen crucible was used as reference.

The homogeneity of the mixtures of components i, ii, and iii, and also of the mixtures prepared for comparison, was determined by pressing these mixtures at 190° C., in each case to give foils of thickness 30 μm. The proportion of undispersed component ii present in these foils was assessed visually.

The degradation rates of the biodegradable polyester mixtures and of the mixtures prepared for comparison was determined as follows:

The biodegradable polyester mixtures and the mixtures prepared for comparison were pressed at 190° C. in each case to give foils of thickness 30 μm. Each of these foils was cut into square pieces with edge length 20 cm. The weight of each of these foil pieces was determined and defined as "100% by weight". The foil pieces were placed on a soil-filled cloth in a cabinet with controlled atmospheric conditions for a period of four weeks, the soil moisture, checked daily, being about 40%, based on the maximum water-absorption capability of the soil. Constant environmental conditions were maintained in the cabinet during these four weeks: a temperature of 30° C., relative humidity of about 50%, and irradiation of the foils via radiation generated by Heraeus SUNTEST accelerated irradiation equipment in the wavelength range from 300 to 800 nm with irradiation intensity of 765 W/m². The residue weight of each of the foil pieces was measured at weekly intervals and recalculated as percentage by weight (based on the weight determined at the start of the experiment and defined as "100% by weight").

Starting Materials:

Component i:

i-1: To prepare the polyester i-1, 87.3 kg of dimethyl terephthalate, 80.3 kg of adipic acid, 117 kg of 1,4-butanediol, and 0.2 kg of glycerol were mixed with 0.028 kg of tetrabutyl orthotitanate (TBOT), the molar ratio between alcohol components and acid components being 1.30. The reaction mixture was heated to a temperature of 180° C. and reacted for 6 h at this temperature. The temperature was then increased to 240° C., and the excess dihydroxy compound was removed by distillation in vacuo over a period of 3 h. 0.9 kg of hexamethylene diisocyanate were then slowly metered in at 240° C. within a period of 1 h.

The resultant polyester i-1 had a melting point of 119° C. and a molar mass ($M_n$) of 23 000 g/mol (corresponds to Ecoflex® FBX 7011, produced by BASF Aktiengesellschaft).

Component ii:

ii-1: aliphatic polyester, Natureworks® 2000D polylactide from Cargill-Dow.

Component iii:

iii-1: Joncryl® ADR 4368 from Johnson Polymer.

iii-2: ESBO: epoxidized soybean oil (e.g. Merginat® ESBO from Hobum, Hamburg, or Edenol® B 316 from Cognis, Dusseldorf).

Other Components:

Additive: erucamide, ethylenebisstearylamide,

Examples 1-3

| Example | Component i | Component ii | Component iii-1 | Component iii-2 |
|---|---|---|---|---|
| Inventive Ex. 1 | 39% by wt. component i-1 (Ecoflex® F) | 60% by wt. polylactide Comp. ii-1 | — | 1% by ESBO |
| Inventive Ex. 2 | 38.8% by wt. component i-1 | 60% by wt. Comp. ii-1 | 0.2% by wt. Joncryl comp. iii-1 | 1% by wt. ESBO |
| Inventive Ex. 3 | 54.8% by wt. component i-1 | 44% by wt. Comp. ii-1 | 0.2% by wt. Joncryl comp. iii-1 | 1% by wt. ESBO |

The mixture of inventive example 2 differs from that of inventive example 1 merely via addition of 0.2% by weight of component iii-1 (Joncryl® ADR 4368 from Johnson Polymer). Component iii-1 was added in the form of a 20% by weight strength branching agent masterbatch dispersed in component i-1 (a total amount of the branching agent masterbatch added to the above mixture being only 1% by weight). During blown-film extrusion to give foils of thickness about 30-40 μm, bubble stability and tear propagation resistance transverse to the direction of extrusion were improved via addition of component iii.

In inventive example 3, the proportion of component i was increased (and the proportion of component ii was reduced). A continuous phase of component i formed. This type of foil had markedly higher bubble stability.

| Example | Transverse tear propagation resistance | Foil thickness | Bubble stability |
|---|---|---|---|
| Inventive Ex. 1 | 19 N/mm | 35 + 7 μm | break-off, holes, bubble "dances", creasing |
| Inventive Ex. 2 | 27 N/mm | 32 + 7 μm | creasing |
| Inventive Ex. 3 | 32 N/mm | 37 + 4 μm | less creasing than in inventive example 2 |

Preparation and testing of inventive polyester mixtures by way of various branching agent masterbatches, inventive examples 4) to 6):

Step 1: Preparation of branching agent masterbatches

| Branching agent masterbatch | Component i | Component ii | Component iii |
|---|---|---|---|
| BR-A | | 90% polylactide | 10% Joncryl ADR 4368 |
| BR-B | 80% Ecoflex F | | 20% Joncryl ADR 4368 |
| BR-C | 70% Ecoflex F | | 30% Joncryl ADR 4368 |

Step 2: Compounding of inventive polyester mixtures

Compounding Specification

Mixtures composed of Ecoflex, PLA, lubricant masterbatch, and branching agent masterbatch were run through a Berstorff ZE 40, which is a corotating, self-cleaning twin-screw extruder with venting downstream of zone 9, with the following temperature profile:
Constitutions:

Inventive Example 4

Ecoflex/PLA

53% NatureWorks 4042 D
40% Ecoflex F BX 7011
5% EBS masterbatch based on PLA with 10% ethylenebisstearylamide
2% BR-A: branching agent masterbatch based on PLA

Inventive Example 5

Ecoflex/PLA

60% NatureWorks 4042 D
38% Ecoflex F BX 7011
1% Ecoflex SL 1 masterbatch with 10% erucamide
1% BR-B: branching agent masterbatch based on Ecoflex

Inventive Example 6

Ecoflex/PLA

60% NatureWorks 4042 D
38% Ecoflex F BX 7011
1% Ecoflex SL 1 masterbatch with 10% erucamide
1% BR-C: branching agent masterbatch based on Ecoflex
These formulations were compounded in the ZE 40.

Processing performance during blown-film extrusion was assessed on a laboratory plant with screw diameter 60 mm. The film-blowing die comprises a spiral mandrel distributor with eight spirals. The die has a diameter of 190 mm and a gap of 1.2 mm. On the basis of a temperature profile with 160-165° C. barrel temperature and 180-185° C. die temperature, the foil ran with limited overall bubble stability, because the polylactide with its known low melt strength is the continuous phase in the compounded Ecoflex/PLA material.

The mechanical measurements give the following results

| Property | Inventive example 4 | Inventive example 5 | Inventive example 6 |
|---|---|---|---|
| modulus of elasticity, parallel | 1681 MPa | 1632 MPa | 1525 MPa |
| modulus of elasticity, perpendicular | 1106 MPa | 1244 MPa | 990 MPa |
| Tensile strain at break, parallel | 326% | 332% | 160% |
| Tensile strain at break, perpendicular | 102% | 135% | 31% |
| Transverse tear propagation resistance | 41 N/mm | 40 N/mm | 43 N/mm |
| Foil thickness | 30 + 8 μm | 29 + 6 μm | 31 + 6 μm |

Mechanical properties are very similar in inventive examples 4 and 5, despite different carriers for the branching agent masterbatch. Thickness distribution is more advantageous when Ecoflex is used as carrier. However, the differences are very small. The proportion of branching agent is 50% higher in inventive example 6 than in inventive examples 4 and 5. This reduces tensile strain at break. Because of the low MVR, bubble stability is markedly higher than in inventive examples 4 and 5.

Flowability tests using melt volume rate (MVR) to ISO 1133 gives the following picture:
Inv. Ex. 4: MVR=3.0 ml/10 min.
Inv. Ex. 5: MVR=1.2 ml/10 min.
Inv. Ex. 6: MVR=0.6 ml/10 min.

Inventive examples 4 and 5 have the same concentration of Joncryl ADR 4368 in the compounded Ecoflex/PLA material. Surprisingly, inventive example 5 exhibits a markedly lower MVR. A branching agent masterbatch based on Ecoflex therefore has advantages over a branching agent masterbatch based on PLA.

Another advantage of the Ecoflex carrier material for the branching agent in the Ecoflex masterbatch FBA in comparison with PLA as carrier material is the higher percentage of PLA that can be admixed without sacrificing the advantageous coherent Ecoflex phase in the compounded material. Furthermore, the masterbatch with Ecoflex as carrier material for the branching agent gives a markedly lower level of specks than the masterbatch with PLA as carrier material for the branching agent, under identical compounding conditions.

Example 7

Blends with PHB

A compounded material comprising the following components was run in a twin-screw kneader with counterclockwise rotation of a diameter 40 mm:
63.7% of Ecoflex® F BX 7011 (BASF Aktiengesellschaft)
16.0% of polyhydroxybutyrate (Biocycle® PHB 94 from PHB Industrial S/A)
8.4% PLA (NatureWorks® 4041 D, Cargill Dow)
6.0% of calcium carbonate (Hydrocarb OG)
4.2% of titanium dioxide (Kronos 2200, Bayer AG)
0.4% of polyethylene glycol (Pluriol® 1500, BASF Aktiengesellschaft)
0.4% of lubricant (Edenol® D 82, Cognis)
0.4% of branching agent (Joncryl®, ADR 4368 from Johnson Polymer) [the branching agent is compounded using a Joncryl/Ecoflex mixing ratio of 10/90 and used (4.0% by weight) in pellet form in the compounded material]
0.5% of zinc stearate (Zincum PS)

The components are predried, premixed in dry form, and introduced by way of the pellet hopper. The following process parameters are specified:
Melt temperature: about 160° C.
Rotation rate: 150 rpm
Throughput: 30 kg/h The compounded material was processed on a blown-film plant with 40 mm screw diameter with grooved feed zone and with a 150 mm diameter die head and 0.8 mm die gap width, to give blown films for carrier bags of thickness 60 μm.

The following process parameters were used here:
Rotation rate: 731 rpm
Throughput: 27 kg/h
Pressure: 135 bar
Take-off: 5.4 m/min take-off speed
Barrel temp. 150/160/165° C. in extruder
Head temp. 170/165/165° C.

Because of the relatively low viscosity of the PHB component, only modest bubble stability is achievable, despite the relatively low level of the barrel zones. It is markedly improved via lowering of the zone temperatures by from 10 to 15° C.

The foil composed of the Ecoflex/PHB compounded material has the following mechanical properties, for 60 μm thickness:

| Test | Unit | Standard | Ecoflex/PHB/PLA |
|---|---|---|---|
| Thickness (average) | μm | | 61 |
| Tensile test, parallel | MPa | ISO 527 | 502 |
| Alternate tensile strength, parallel | MPa | ISO 527 | 27.7 |
| Tensile strain at break, parallel | % | ISO 527 | 419 |
| Tensile test, perpendicular | MPa | ISO 527 | 301 |
| Alternate tensile strength, perpendicular | MPa | ISO 527 | 26.8 |
| Tensile strain at break, perpendicular | % | ISO 527 | 540 |
| Puncture resistance | N/mm | DIN 53373 | 26.6 |

The invention claimed is:

1. A biodegradable polyester mixture, comprising
   i) from 5 to 80% by weight, based on the total weight of i) and ii), and component i) comprises
      A) an acid component composed of
         a1) from 40 to 60 mol % of succinic acid, adipic acid, sebacic acid, their ester-forming derivatives, or mixtures thereof; and
         a2) from 40 to 60 mol % of terephthalic acid or its ester-forming derivatives;
      wherein the sum of the molar percentages of a1) and a2), equal 100%; and
      B) is 1,4-butanediol or 1,3-propanediol
   and
      D) optionally a component selected from the group consisting of
         d1) at least one compound having at least three groups capable of ester formation;
         d2) at least one isocyanate;
         d3) at least one divinyl ether; and
         d4) mixtures thereof:
   and
   ii) from 20 to 95% by weight, based on the total weight of i) and ii), of polyhydroxybutyrate or polyhydroxybutyrate-co-valerate; and
   iii) from 0.1 to 15% by weight, based on the total weight of i) and ii), of a copolymer composed of styrene and glycidyl (meth)acrylates; and
   iv) from 0 to 15% by weight of additive; and
   v) from 0 to 50% by weight of inorganic or organic filler.

2. The biodegradable polyester mixture of claim 1, wherein i) forms a continuous phase.

3. The biodegradable polyester mixture of claim 1, wherein iii) is present in an amount of from 0.1 to 10% by weight, based on the total weight of i) and ii).

4. A process for preparing the biodegradable polyester mixture of claim 1, wherein said process comprises the step of mixing and reacting i), ii), and iii).

5. A process for preparing the biodegradable polyester mixture of claim 1, wherein said process comprises the steps of:
   (1) mixing from 5 to 35% by weight of iii) with from 65 to 95% by weight of i) at a temperature in the range of from 110 to 145° C. to give a branching agent masterbatch, and
   (2) admixing ii), and optionally additional i), with said branching agent masterbatch, and reacting the resultant mixture of i), ii), and iii) at a temperature in the range of from 150 to 250° C.

6. The process of claim 5, further comprising the additional step (3) of adding additional ii) to said resultant mixture.

7. The process of claim 6, wherein polymeric or oligomeric 1,3-propionate of sebacic acid and/or 1,4-butanoate of sebacic acid is added to one or more of steps (1), (2), or (3).

8. The process of claim 4, wherein polymeric or oligomeric 1,3-propionate of sebacic acid and/or 1,4-butanoate of sebacic acid is added during said step.

9. A molding, foil, or fiber comprising the biodegradable polyester mixture of claim 1.

10. The biodegradable polyester mixture of claim 1, wherein component ii) is polyhydroxybutyrate.

11. The biodegradable polyester mixture of claim 1, wherein component ii) is polyhydroxybutyrate-co-valerate.

* * * * *